UNITED STATES PATENT OFFICE.

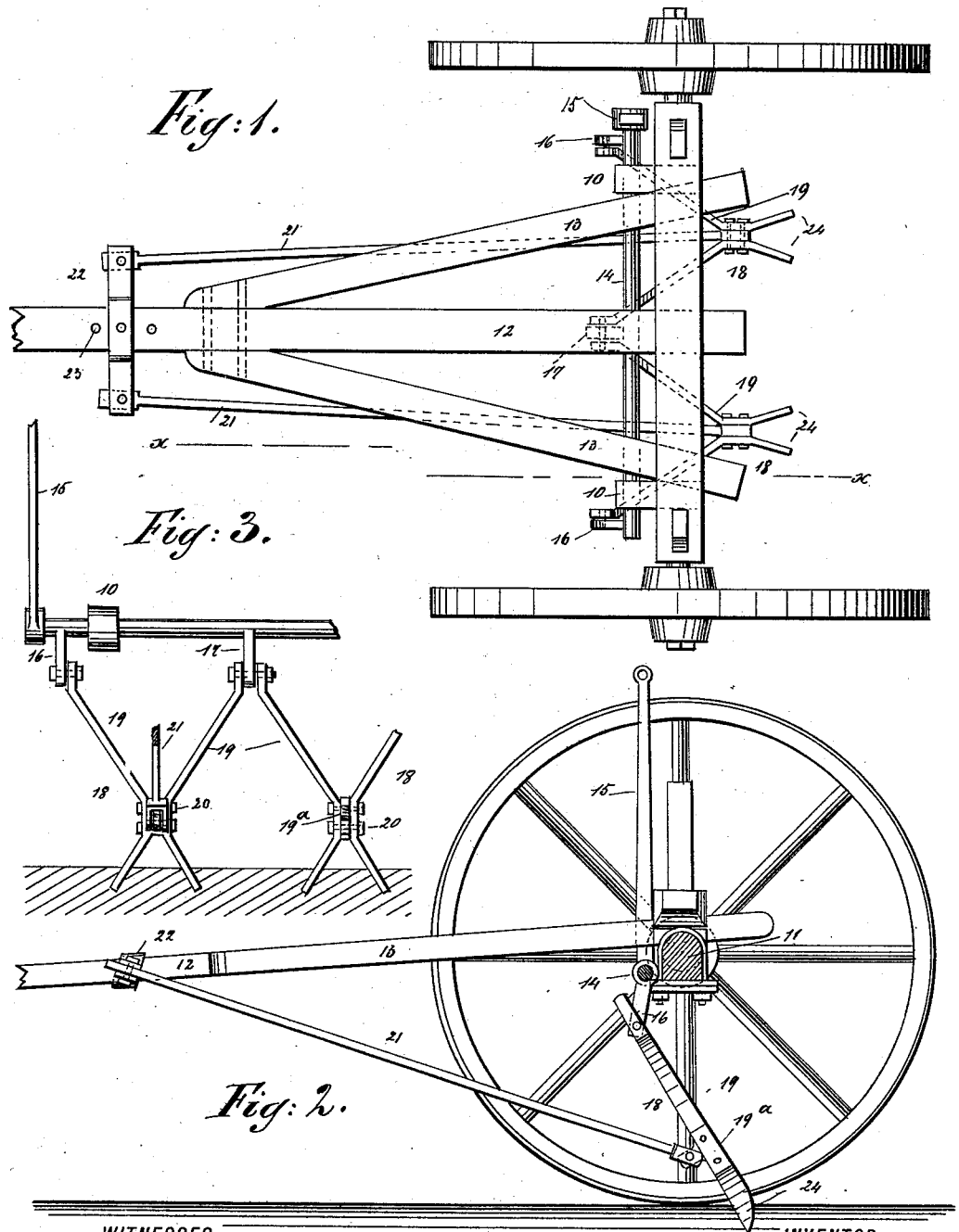

WILLIAM R. WILCOX, OF PORTLAND, COLORADO.

LOCK-BRAKE FOR VEHICLES.

SPECIFICATION forming part of Letters Patent No. 393,949, dated December 4, 1888.

Application filed September 5, 1888. Serial No. 284,651. (No model.)

*To all whom it may concern:*

Be it known that I, WILLIAM R. WILCOX, of Portland, in the county of Ouray and State of Colorado, have invented a new and Improved Lock-Brake for Vehicles, of which the following is a full, clear, and exact description.

My invention relates to an improved lock-brake for vehicles, and has for its object to provide a device of simple and durable construction, which may be conveniently and expeditiously applied, whereby the vehicle will be held secure in ascending and descending a steep grade or when traveling upon the ice.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a partial plan view of the running-gear of a vehicle having my improvement applied. Fig. 2 is a partial longitudinal vertical section on line $x\,x$ of Fig. 1; and Fig. 3 is a partial rear elevation or end view of the brake.

In carrying out the invention, forwardly-extending bearings 10 are projected from the axle 11 of the vehicle, two bearings being preferably employed, one located at each side of the reach 12 and outside of the rear hounds, 13.

In the bearings 10 a rock-shaft, 14, is journaled, provided at one end with an attached lever, 15, which lever is adapted to extend vertically upward between one of the hounds and the wheel. At or near each end of the rock-shaft a lug, 16, is secured or cast integral with the said shaft, and at or about the center a similar lug, 17, is attached.

The brakes 18 are adapted to be pivoted to the said lugs 16 and 17, and consist each of two angle-bars 19, the upper member whereof is longer than the lower member, as best shown in Fig. 3. Each angle-bar of the set is provided with a flat surface, 19$^a$, at the intersection of the two members, and the said bars of the set are united at the said flat surface through the medium of bolts 20 or other suitable or equivalent fastening devices.

The upper ends of the several angle-bars of the brakes are made to align, and are pivoted, respectively, to the lugs 16 and 17, one angle-bar being pivoted to one of the outer lugs and the opposing angle-bar to one side of the central lug. By reason of the shape of the angle-bars the brakes partake somewhat of the contour of the letter X, the lower forked end of the X being shorter than the upper forked end, as hereinbefore stated.

Between the contiguous flattened faces of each brake a rod, 21, is pivoted, which rod extends in direction of the forward wheels of the vehicle, being pivoted at the opposite end to an equalizing-bar, 22, pivoted upon the reach, as best shown in Fig. 1. The equalizing-bar is centrally pivoted upon the reach, and the reach to that end is provided with a series of apertures, 23, adapted to receive the pivotal bolt.

The lower ends of the brakes adapted for engagement with the soil or ice are preferably sharpened or pointed, as best shown in Fig. 2 at 24.

It will be observed that by the manipulation of the lever 15 the shaft 14 is rocked, causing the lower extremities of the brakes to be either buried in the surface upon which the vehicle is traveling or be elevated above the said surface, as occasion may demand.

If in practice it is found desirable, a spring of any approved form may be attached to the standard and bear against the brake-lever to assist in throwing off the brake.

Having thus described my invention, what I claim as new, and desire to secure by Letters Patent, is—

1. The combination, with the axle of a vehicle and a rock-shaft journaled upon said axle, of a lever attached to one end of said shaft, lugs projecting from the shaft, and fork-like brake-bars pivoted to said lugs, substantially as shown and described.

2. The combination, with the axle of a vehicle, a rock-shaft journaled upon said axle, and a lever secured to one end of said shaft, of lugs projected from each end and the center of the shaft, and fork-like brakes pivoted to the said lugs, consisting of united angle-bars, the lower member whereof is shorter than the upper member, as set forth.

3. The combination, with the axle of a vehicle, a rock-shaft journaled upon the same, a lever secured to one end of the said shaft, and lugs projected from the ends and center of the same, of fork-like brakes pivoted to said lugs, an equalizing-bar pivoted upon the reach of the vehicle, and a connecting-rod uniting the several brakes and the extremities of the said equalizing-bar, as and for the purpose specified.

4. The combination, with the axle of a vehicle, a rock-shaft journaled upon the same, a lever secured to one end of said shaft, and lugs projecting from the same near the extremities and at the center, of two fork-like brakes pivoted to said lugs, each consisting of opposing angle-bars having the lower member shorter than the upper member and provided with a flattened surface at the intersection of the two members and bolts passing through the said flattened surface, an equalizing-bar pivoted to the reach, and a connecting-rod pivoted between the angle-bars of each brake at their flattened surface and pivoted at the opposite end to the several extremities of the equalizing-bar, all combined to operate substantially as shown and described.

WILLIAM R. WILCOX.

Witnesses:
JOHN P. ROSS,
D. C. HARTWELL.